US012810712B2

(12) United States Patent
Uchida et al.

(10) Patent No.: US 12,810,712 B2
(45) Date of Patent: Nov. 24, 2026

(54) NOTIFICATION SYSTEM AND NOTIFICATION METHOD

(71) Applicant: JVCKENWOOD Corporation, Yokohama (JP)

(72) Inventors: Saki Uchida, Yokohama (JP); Junichi Kasuya, Yokohama (JP); Tatsumi Naganuma, Yokohama (JP); Yasushi Jinbo, Yokohama (JP); Tomohisa Kobayashi, Yokohama (JP); Kodai Nakamura, Yokohama (JP); Manamu Takahashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 6 days.

(21) Appl. No.: 19/029,775

(22) Filed: Jan. 17, 2025

(65) Prior Publication Data

US 2025/0166477 A1 May 22, 2025

Related U.S. Application Data

(63) Continuation of application No. PCT/JP2023/025148, filed on Jul. 6, 2023.

(30) Foreign Application Priority Data

Sep. 26, 2022 (JP) ................................ 2022-152620

(51) Int. Cl.

| | |
|---|---|
| ***G08B 21/02*** | (2006.01) |
| ***G10L 15/187*** | (2013.01) |
| ***G10L 15/26*** | (2006.01) |

(52) U.S. Cl.

CPC ..... *G08B 21/0208* (2013.01); *G08B 21/0225* (2013.01); *G08B 21/0236* (2013.01);

(Continued)

(58) Field of Classification Search

CPC ............... G06Q 10/40; G06Q 30/0207; G06Q 30/0241; G06Q 10/10; G06Q 10/0833;

(Continued)

(56) References Cited

U.S. PATENT DOCUMENTS 7,672,700 B2 * 3/2010 Oda .................... H04M 1/0235 455/575.4
10,389,980 B2 * 8/2019 Izawa .................... H04N 23/56

(Continued)

FOREIGN PATENT DOCUMENTS

JP 2004336550 A 11/2004
JP 2016-139925 A 8/2016

(Continued)

OTHER PUBLICATIONS

International Search Report of PCT/JP2023/025148, dated Sep. 12, 2023, 4 pages.

*Primary Examiner* — Daniel Previl
(74) *Attorney, Agent, or Firm* — Procopio, Cory, Hargreaves & Savitch LLP

(57) ABSTRACT

A notification system includes a terminal information acquisition unit configured to acquire position information of a parent terminal (see FIG. 2) and position information of a child terminal (see FIG. 3) that performs communication with the parent terminal, and to acquire a positional relationship between the parent terminal and the child terminal, a detection unit configured to detect that the positional relationship between the parent terminal and the child terminal satisfies a condition that is set in advance, a sound acquisition unit configured to acquire a sound of surroundings of the child terminal, in a case where the detection unit detects that the positional relationship between the parent terminal and the child terminal satisfies the condition that is set in advance, and a sound information output unit config- (Continued)

ured to output, from the parent terminal, information that is based on the sound acquired by the sound acquisition unit.

5 Claims, 10 Drawing Sheets

(52) U.S. Cl.
CPC ........ *G08B 21/0266* (2013.01); *G10L 15/187* (2013.01); *G10L 15/26* (2013.01)

(58) Field of Classification Search
CPC ........ G06Q 10/00; G06Q 20/00; G06Q 30/00; G06Q 40/00; G06Q 50/00; G06Q 90/00; G06Q 99/00; G06Q 2230/00; G06Q 2220/00; G06Q 2240/00; G06Q 2250/00; H04M 1/2535; H04M 1/57; H04M 1/65; H04M 1/656; H04M 1/72436; H04M 1/72448; H04M 19/04; H04M 19/041; H04M 2201/36; H04M 2201/38; H04M 2201/50; H04M 2203/2038; H04M 2203/308; H04M 2203/551; H04M 2250/12; H04M 3/02; H04M 3/42051; H04M 3/42221; H04M 3/42348; H04M 1/2755; H04M 3/56; H04M 3/562; H04M 3/566; H04L 65/403; H04L 51/216; H04L 51/52; H04L 65/1089; H04L 12/1822; H04L 65/1069; H04L 65/1094; H04L 67/04; H04L 67/12; H04L 67/131; H04L 67/146; H04L 67/148; H04L 67/53; H04L 12/1827; H04L 63/08; H04L 63/0876; H04L 65/4038; H04L 27/2272; H04L 5/16; H04L 5/001; H04L 5/003; H04L 5/0051; H04L 5/0094; H04L 15/00; H04L 13/00; H04L 12/00; H04L 9/00; H04L 7/00; H04L 5/00; H04L 2463/00; H04L 2212/00; H04L 2209/00; H04L 2203/00; H04L 2201/00; H04L 2101/00; H04N 7/15; H04N 7/147; G10L 15/1815; G10L 15/1822; G10L 15/22; G10L 25/63; G10L 17/00; G10L 15/00; G10L 15/26; G10L 13/00; G10L 21/00; G10L 19/00; G10L 25/00; G10L 99/00; H04W 4/80; H04W 4/02; H04W 4/022; H04W 4/029; H04W 4/10; H04W 4/40; H04W 4/70; H04W 76/14; H04W 76/27; H04W 76/45; H04W 92/18; H04W 12/068; H04W 4/021; H04W 4/023; H04W 4/027; H04W 4/08; H04W 4/48; H04W 64/00; H04W 56/0015; H04W 36/185; H04W 72/044; H04W 72/0446; H04W 74/0833; H04W 76/15; H04W 84/047; H04W 88/085; A63F 13/525; A63F 13/537; A63F 13/837; E02F 9/2054; E02F 9/24; E02F 9/261; G01S 19/43; G01S 13/886; G01S 2013/0245; G01S 7/003; G01S 1/00; G01S 3/00; G01S 5/00; G01S 7/00; G01S 11/00; G01S 2205/00; G01S 2201/00; G01S 19/00; G01S 15/00; G01S 13/00; G06F 2203/04803; G06F 3/04855; G06F 3/16; G06F 40/35; G06F 40/56; G06F 3/0481; G08B 21/02; G08B 21/0225; G08B 21/0236; G08B 21/0269; G08B 21/0283; G08B 25/10; G08B 1/00; G08B 3/00; G08B 5/00; G08B 6/00; G08B 7/00; G08B 9/00; G08B 13/00; G08B 15/00; G08B 17/00; G08B 19/00; G08B 21/00; G08B 23/00; G08B 25/00; G08B 26/00; G08B 27/00; G08B 29/00; G08B 31/00; G08B 21/0222; G08B 21/0227; G08B 21/0238; G08B 21/0247; G08B 21/0294; G08B 21/088; G01C 21/36; G08G 1/205; G09B 29/106; B25J 11/0015; G06N 3/008; G06N 3/00; G06N 5/00; G06N 7/00; G06N 10/00; G06N 20/00; G06N 99/00; G06V 20/10; G06V 40/172; G06V 10/00; G06V 20/00; G06V 30/00; G06V 40/00; G06V 2201/00; H04B 7/15528; H04B 3/00; H04B 1/00; H04B 2210/00; H04B 2215/00; H04B 2203/00; H04B 2201/00; H04B 17/00; H04B 15/00; H04B 14/00; H04B 13/00; H04B 11/00; H04B 10/00; H04B 7/00; H04B 5/00
USPC .... 340/573.1, 901, 902, 903, 904, 905, 908, 340/926, 929, 938, 950, 961, 973, 994
See application file for complete search history.

(56) References Cited

U.S. PATENT DOCUMENTS

| | | | | |
|---|---|---|---|---|
| 11,618,322 B2* | 4/2023 | Yu | G08G 1/16 | 340/901 |
| 2014/0067262 A1* | 3/2014 | Iketani | G01C 22/006 | 701/518 |
| 2014/0172198 A1* | 6/2014 | Kobayashi | G07C 5/008 | 701/2 |
| 2014/0177813 A1* | 6/2014 | Leeds | H04M 3/42051 | 379/67.1 |
| 2017/0310882 A1* | 10/2017 | Nagao | H04N 23/62 | |
| 2017/0372286 A1* | 12/2017 | Hiroi | G06Q 20/202 | |
| 2020/0210731 A1* | 7/2020 | Yamanaka | G06V 20/59 | |
| 2021/0080141 A1* | 3/2021 | Tsuboi | F24F 11/50 | |
| 2022/0282984 A1* | 9/2022 | Kinuhata | G08G 1/205 | |

FOREIGN PATENT DOCUMENTS

| | | |
|---|---|---|
| JP | 2022012794 A | 1/2022 |
| JP | 2022-096146 A | 6/2022 |

* cited by examiner

NOTIFICATION SYSTEM AND NOTIFICATION METHOD

CROSS REFERENCE TO RELATED APPLICATION

This application is based upon and claims the benefit of priority from International Patent Application No. PCT/JP2023/025148 filed on Jul. 6, 2023, which is based on Japanese patent application No. 2022-152620, filed on Sep. 26, 2022, the disclosure of which is incorporated herein in its entirety by reference.

BACKGROUND

The present invention relates to a notification system and a notification method.

These days, systems are used that can prevent a trouble such as a child getting lost, by grasping a position using a mobile terminal, a monitoring tag or the like for children when a child who is a ward moves away from a guardian such as a parent. Patent Literature 1 discloses a technology for issuing a notification when a relative distance between a terminal of a child and a terminal of a parent is increased.

[Patent Literature 1]

Japanese Unexamined Patent Application Publication No. 2022-012794

SUMMARY

However, with the technology disclosed in Patent Literature 1, even when there is a notification, a situation surrounding a child cannot be checked, and therefore there is a problem that it cannot be determined whether the child is safe or is in trouble. Accordingly, a system is desired that allows a guardian such as a parent to accurately grasp a situation surrounding a ward such as a child even when the child moves to a location away from the parent, and that thus prevents the child from getting into trouble.

A notification system according to the present disclosure includes: a terminal information acquisition unit configured to acquire position information of a first terminal and position information of a second terminal that performs communication with the first terminal, and to acquire a positional relationship between the first terminal and the second terminal; a detection unit configured to detect that the positional relationship between the first terminal and the second terminal satisfies a condition that is set in advance; a sound acquisition unit configured to acquire a sound of surroundings of the second terminal, in a case where the detection unit detects that the positional relationship between the first terminal and the second terminal satisfies the condition that is set in advance; and a sound information output unit configured to output, from the first terminal, information that is based on the sound acquired by the sound acquisition unit.

Accordingly, when the first terminal that is a parent terminal and the second terminal that is a child terminal move away from each other, a sound around the child terminal can be transmitted to the parent terminal.

A notification method according to the present disclosure includes: a terminal information acquisition step of acquiring position information of a first terminal and position information of a second terminal that performs communication with the first terminal, and of acquiring a positional relationship between the first terminal and the second terminal; a detection step of detecting that the positional relationship between the first terminal and the second terminal satisfies a condition that is set in advance; a sound acquisition step of acquiring a sound of surroundings of the second terminal, in a case where it is detected in the detection step that the positional relationship between the first terminal and the second terminal satisfies the condition that is set in advance; and a sound information output step of outputting, from the first terminal, information that is based on the sound that is acquired.

Accordingly, when the first terminal that is a parent terminal and the second terminal that is a child terminal move away from each other, a sound around the child terminal can be transmitted to the parent terminal.

The notification system and the notification method according to the present disclosure allow a guardian such as a parent to accurately grasp a situation surrounding a ward such as a child, and the child can be prevented from getting into trouble.

The above and other objects, features and advantages of the present disclosure will become more fully understood from the detailed description given hereinbelow and the accompanying drawing.

DETAILED DESCRIPTION

First Embodiment

Figure 1:
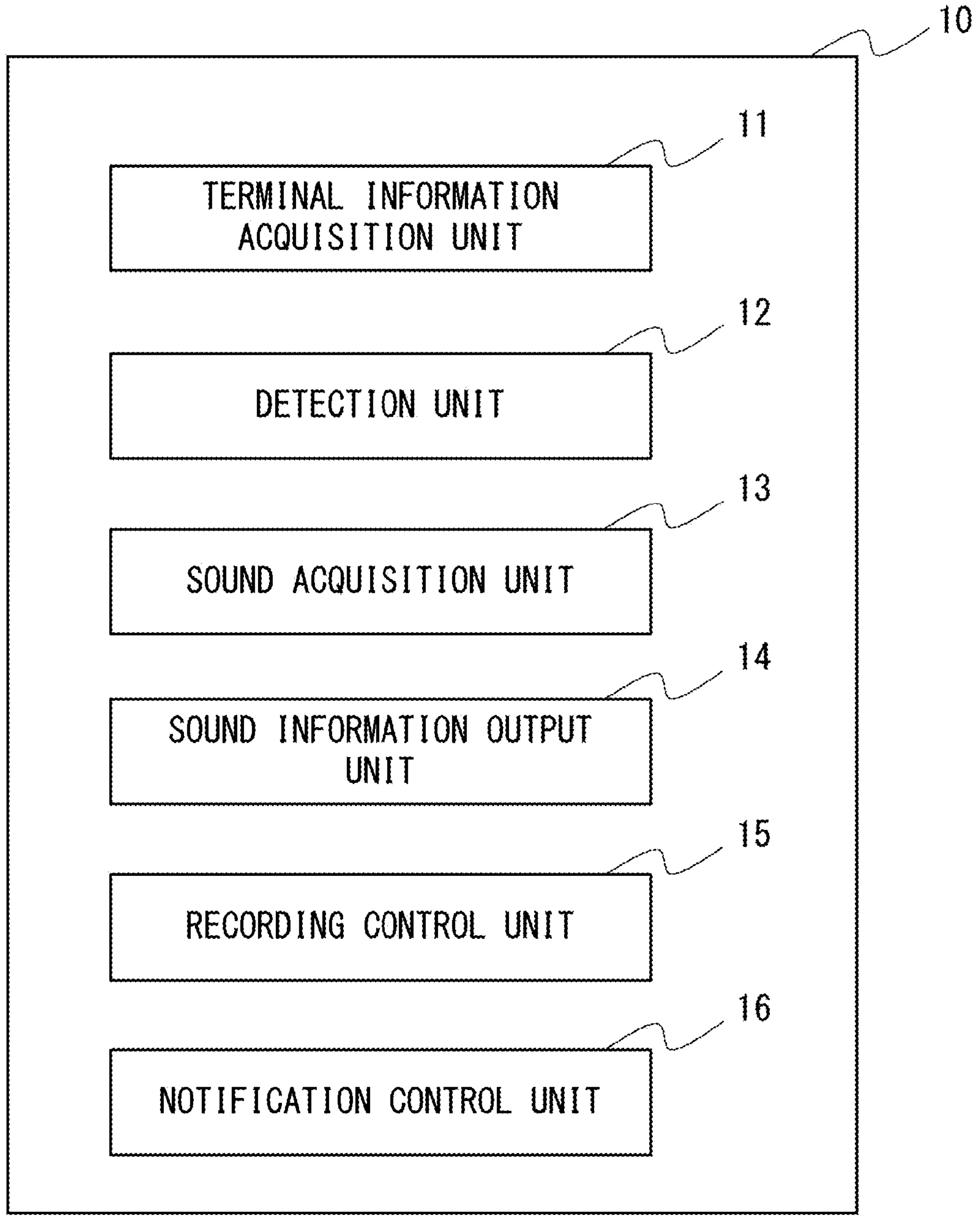
FIG. 1 is a diagram showing an example configuration of a notification system according to a first embodiment.

In the following, a present embodiment will be described with reference to the drawings. FIG. 1 is a diagram showing an example configuration of a notification system 10. The notification system 10 includes a terminal information acquisition unit 11, a detection unit 12, a sound acquisition unit 13, a sound information output unit 14, a recording control unit 15, and a notification control unit 16. Functions of the notification system 10 according to the present embodiment are implemented by a first terminal and a second terminal that performs communication with the first terminal. In the present embodiment, a description will be given assuming that the first terminal is a parent terminal 20, and the second terminal that is associated with the parent terminal 20 is a child terminal 30.

Figure 2:
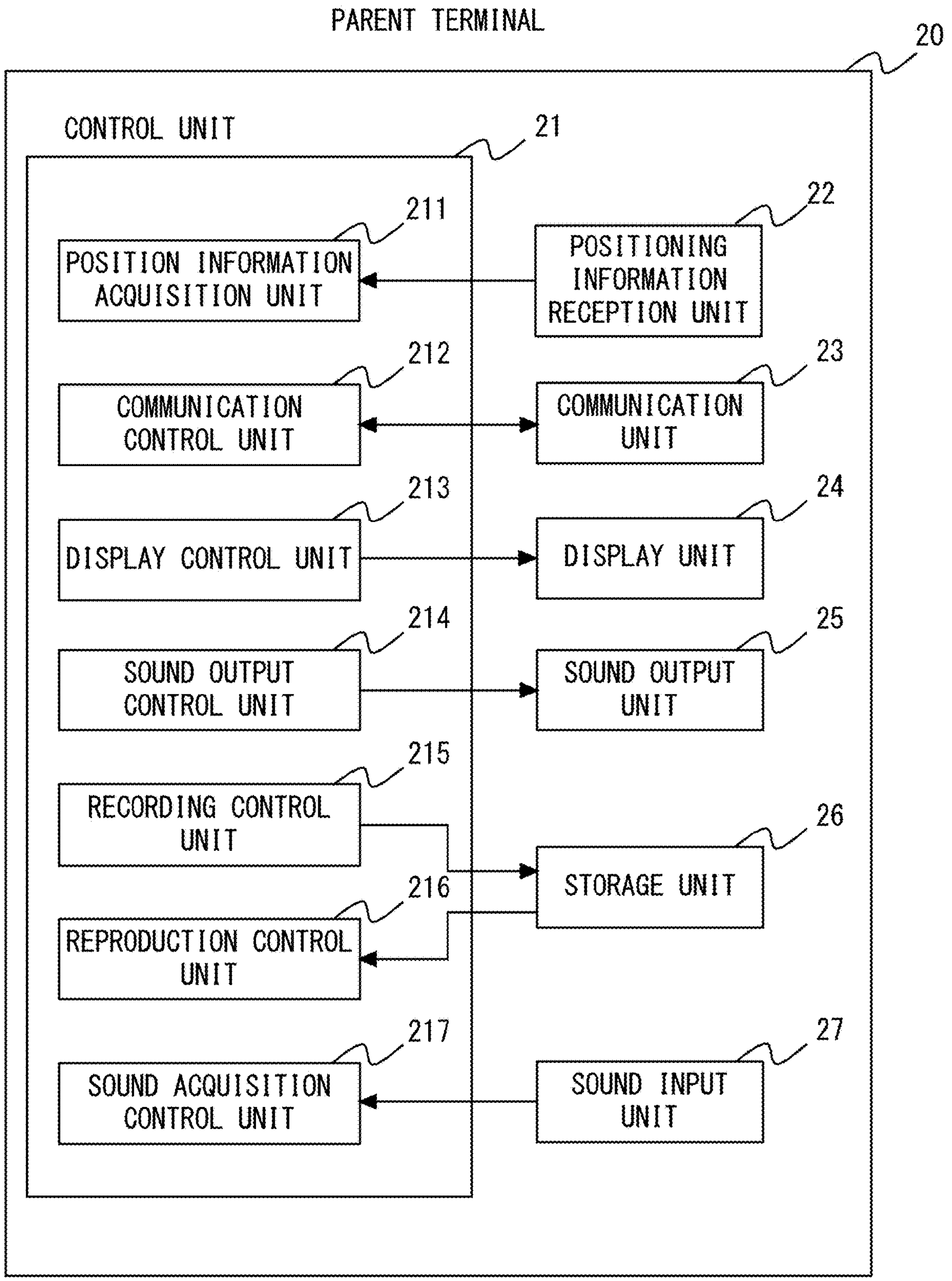
FIG. 2 is a diagram showing an example configuration of a parent terminal according to the first embodiment.
Figure 3:
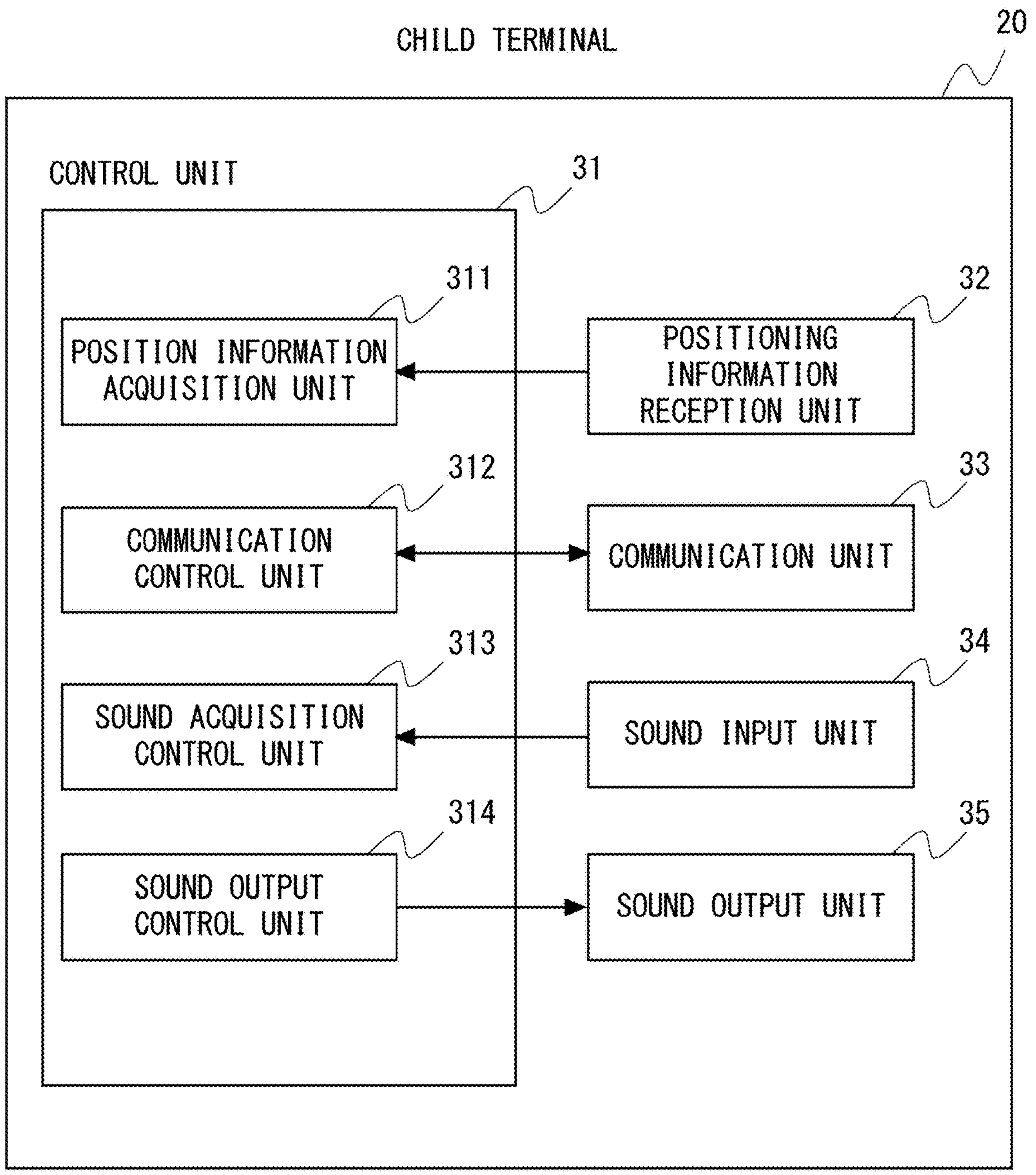
FIG. 3 is a diagram showing an example configuration of a child terminal according to the first embodiment.
Figure 4:
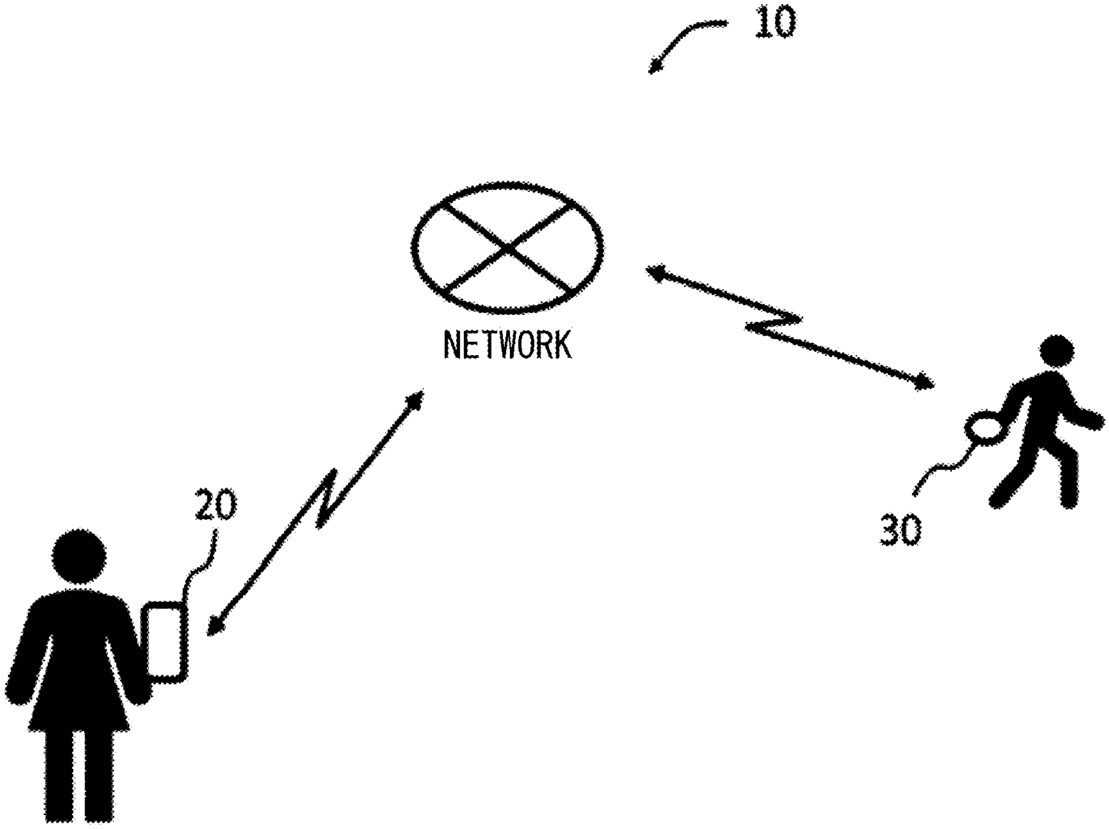
FIG. 4 is a conceptual diagram showing a state where the parent terminal and the child terminal according to the first embodiment are connected via a network.

First, configurations of the parent terminal 20 as the first terminal, and the child terminal 30 as the second terminal will be described with reference to FIGS. 2 and 3. A function of each component of the notification system 10 can be implemented by a combination of functions of components of the parent terminal 20 and the child terminal 30. Additionally, the present embodiment describes that the parent terminal 20 and the child terminal 30 can perform communication via a network in the manner shown in FIG. 4, but the parent terminal 20 and the child terminal 30 may instead directly communicate with each other.

The parent terminal 20 is an information terminal such as a smartphone or a tablet terminal that is carried by a guardian such as a parent. As shown in FIG. 2, the parent terminal 20 includes a control unit 21, a positioning information reception unit 22, a communication unit 23, a display unit 24, a sound output unit 25, a storage unit 26, and a sound input unit 27. The control unit 21 is configured by a storage apparatus, such as a memory, and an arithmetic apparatus, such as a central processing unit (CPU), provided in the terminal, and implements various functions by executing programs stored in a memory such as a read only memory (ROM) or a random access memory (RAM) in the arithmetic apparatus. Functional blocks to be implemented by the control unit 21 include a position information acquisition unit 211, a communication control unit 212, a display control unit 213, a sound output control unit 214, a recording control unit 215, a reproduction control unit 216, and a sound acquisition control unit 217.

The positioning information reception unit 22 is a module for receiving radio waves for performing positioning, such as positioning radio waves from a Global Navigation Satellite System (GNSS) satellite or radio waves from a Bluetooth Low Energy (BLE) beacon. The positioning information reception unit 22 outputs a signal indicating position information that is received to the position information acquisition unit 211.

The communication unit 23 is a communication module for performing direct wireless communication with the child terminal 30, or for performing wireless communication with the child terminal 30 via a network. The communication unit 23 outputs a signal obtained by demodulating a received radio wave to the communication control unit 212, and modulates and transmits a signal transmitted from the communication control unit 212.

The display unit 24 displays various videos including text and images. For example, the display unit 24 is a display including a display panel such as a liquid crystal display. The display unit 24 performs display based on a video signal output from the display control unit 213.

The sound output unit 25 is a connection terminal for connecting a speaker for outputting a sound, an earphone for outputting a sound, or the like, and outputs a sound signal output from the sound output control unit 214 in a form that can be heard by a user of the parent terminal 20. The sound output unit 25 may include a digital-to-analog (D/A) conversion unit and an amplification unit that are not shown.

The storage unit 26 is an internal memory of the parent terminal 20, and is configured by a semiconductor memory or the like. The storage unit 26 stores information such as sounds and videos by being controlled by the recording control unit 215. The storage unit 26 outputs stored information such as sounds and videos by being controlled by the reproduction control unit 216. The storage unit 26 may be a storage element that can be attached/detached from the parent terminal 20, or may be an external storage apparatus with which communication is performed via the communication unit 23.

The sound input unit 27 is a sound input apparatus such as a microphone, and acquires a sound around the parent terminal 20. The sound input unit 27 outputs a signal that is based on the acquired sound to the sound acquisition control unit 217.

The position information acquisition unit 211 acquires position information of the parent terminal 20 by controlling operation of the positioning information reception unit 22. More specifically, the position information acquisition unit 211 calculates the position information based on a positioning radio wave from the global navigation satellite system (GNSS) satellite received by the positioning information reception unit 22, or, in the case of being inside a facility such as a shopping mall, based on a radio wave from the BLE beacon, for example. The position information calculated by the position information acquisition unit 211 is current position information of the parent terminal 20.

The communication control unit 212 performs communication with other terminals and other apparatuses by controlling operation of the communication unit 23. Here, the communication control unit 212 communicates with the child terminal 30 via a network. In other words, the communication control unit 212 controls the communication unit 23 to receive information that is based on a sound input to the child terminal 30. Information that is based on a sound may be sound data including information that is the sound itself, or may be text data generated based on the sound, for example. Furthermore, the communication control unit 212 can control the communication unit 23 such that position information of the parent terminal 20 and the child terminal 30 is transmitted/received. Additionally, the communication control unit 212 also allows communication with apparatuses other than the child terminal 30, and communication counterparts are not particularly limited.

The display control unit 213 controls display of information that is to be displayed on the display unit 24. For example, in the case where text data is received from the child terminal 30 via the communication unit 23, the display control unit 213 causes the display unit 24 to display the text data. Additionally, in the case where the position information acquired by the position information acquisition unit 211, details of communication controlled by the communication control unit 212, position information from the child terminal 30, or the like is received, the display control unit 213 can cause the display unit 24 to display such information, but such an example is not restrictive.

The sound output control unit 214 controls a sound that is output from the sound output unit 25. For example, the sound output control unit 214 causes the sound output unit 25 to output a sound of sound data that is input to a sound input unit 34 of the child terminal 30, described later, and received via the communication unit 23. Additionally, as described later, in the case where sound data received from the child terminal 30 is recorded in the storage unit 26 of the parent terminal 20, the sound output control unit 214 may reproduce sound of the recorded sound data and cause the same to be output to the sound output unit 25. Additionally, the sound output unit 25 can also output sounds other than the sound input to the child terminal 30, and output details are not limited.

The recording control unit 215 records information that is based on the sound received from the child terminal 30. More specifically, in the case where sound data input to the child terminal 30 is received via the communication unit 23, the recording control unit 215 stores the same in the storage unit 26, such as a memory, provided in the parent terminal 20. Additionally, also in the case where the information that is based on the sound received from the child terminal 30 is text data, the recording control unit 215 stores the same in the storage unit 26 provided in the parent terminal 20.

The reproduction control unit 216 performs control for reproduction, in relation to the information based on the sound that is recorded in the storage unit 26 of the parent terminal 20 by the recording control unit 215. For example, in the case where the information based on the sound is sound data, the reproduction control unit 216 performs control in cooperation with the sound output control unit 214 such that the sound data recorded in the parent terminal 20 is output from the sound output unit 25. Furthermore, for example, in the case where the information based on the sound is text data, the reproduction control unit 216 performs control in cooperation with the display control unit 213 such that the text data recorded in the parent terminal 20 is displayed on the display unit 24.

The sound acquisition control unit 217 controls a sound that is input from the sound input unit 27. For example, the sound acquisition control unit 217 controls the sound input unit 27 and acquires a sound around the parent terminal 20, based on a sound acquisition request.

Next, a description will be given of the child terminal 30. The child terminal 30 is an information terminal, such as a smartphone, a smartwatch or a monitoring tag, that is carried by a ward such as a child. As shown in FIG. 3, the child terminal 30 includes a control unit 31, a positioning information reception unit 32, a communication unit 33, the sound input unit 34, and a sound output unit 35. Furthermore, the control unit 31 is configured by a storage apparatus, such as a memory, and an arithmetic apparatus, such as a CPU, provided in the terminal, and implements various functions by executing programs stored in a memory such as a ROM or a RAM in the arithmetic apparatus. Functional blocks to be implemented by the control unit 31 include a position information acquisition unit 311, a communication control unit 312, a sound acquisition control unit 313, and a sound output control unit 314. Additionally, the child terminal 30 is a terminal that is registered in advance in association with the parent terminal 20. The child terminal 30 does not have to include the sound output unit 35 and the sound output control unit 314.

The positioning information reception unit 32 is a module for receiving radio waves for performing positioning, such as positioning radio waves from the GNSS satellite or radio waves from the BLE beacon. The positioning information reception unit 32 outputs a signal indicating position information that is received to the position information acquisition unit 311.

The communication unit 33 is a communication module for performing direct wireless communication with the parent terminal 20, or for performing wireless communication with the parent terminal 20 via a network. The communication unit 33 outputs a signal obtained by demodulating a received radio wave to the communication control unit 312, and modulates and transmits a signal transmitted from the communication control unit 312.

The sound input unit 34 is a sound input apparatus such as a microphone, and acquires a sound around the child terminal 30. The sound input unit 34 outputs a signal that is based on the acquired sound to the sound acquisition control unit 313.

The sound output unit 35 is a speaker for outputting sound, and outputs a sound signal output from the sound output control unit 314 in a form that can be heard by a user of the child terminal 30. The sound output unit 35 may include a digital-to-analog (D/A) conversion unit and an amplification unit that are not shown.

The position information acquisition unit 311 acquires position information of the child terminal 30 by controlling operation of the positioning information reception unit 32. More specifically, the position information acquisition unit 311 calculates the position information based on a positioning radio wave from the GNSS satellite received by the positioning information reception unit 32, or, in the case of being inside a facility such as a shopping mall, based on a radio wave from the BLE beacon, for example. The position information calculated by the position information acquisition unit 311 is current position information of the child terminal 30.

The communication control unit 312 performs communication with other terminals and other apparatuses by controlling operation of the communication unit 33. Here, the communication control unit 312 communicates with the parent terminal 20 via a network. In other words, the communication control unit 312 controls the communication unit 33 to transmit information that is based on a sound input to the child terminal 30 to the parent terminal 20. Furthermore, the communication control unit 312 can control the communication unit 33 such that the position information of the parent terminal 20 and the child terminal 30 is transmitted/received. Additionally, a communication counterpart of the communication unit 33 is not limited to the parent terminal 20, and the communication counterparts are not limited.

The sound acquisition control unit 313 controls a sound that is input from the sound input unit 34. For example, the sound acquisition control unit 313 controls the sound input unit 34 and acquires a sound around the child terminal 30, based on a sound acquisition request from the parent terminal 20 received via the communication unit 33.

The sound output control unit 314 controls a sound that is output from the sound output unit 35. For example, the sound output control unit 314 causes the sound output unit 35 to output a sound of sound data that is input to the sound input unit 27 of the parent terminal 20, described later, and received via the communication unit 33.

Next, a description will be given of examples of functional units of the parent terminal 20 and the child terminal 30 and operation thereof at a time of implementing, by the parent terminal 20 and the child terminal 30, functions of the terminal information acquisition unit 11, the detection unit 12, the sound acquisition unit 13, the sound information output unit 14, the recording control unit 15, and the notification control unit 16, which are functional blocks of the notification system 10.

The terminal information acquisition unit 11 acquires position information of the parent terminal 20 that is the first terminal, and position information of the child terminal 30 that is the second terminal, and acquires a positional relationship between the parent terminal 20 and the child terminal 30.

Here, the terminal information acquisition unit 11 is configured by the position information acquisition unit 211 and the communication control unit 212 of the parent terminal 20. More specifically, the communication control unit 212 of the parent terminal 20 acquires position information acquired by the position information acquisition unit 311 of the child terminal 30, via the communication unit 23 and the communication unit 33.

The detection unit 12 is configured by the control unit 21 of the parent terminal 20. The detection unit 12 detects that the positional relationship between the parent terminal 20 that is the first terminal and the child terminal 30 that is the second terminal satisfies a condition that is set in advance. For example, due to operation of the terminal information acquisition unit 11, the parent terminal 20 holds the position information of the parent terminal 20 and the position information of the child terminal 30. Accordingly, based on the positional relationship between the parent terminal 20 and the child terminal 30, the parent terminal 20 can calculate a distance between the two. The detection unit 12 detects that a distance between the parent terminal 20 and the child terminal 30 is a predetermined distance that is set in advance or more, or that a section where the parent terminal 20 is present and a section where the child terminal 30 is present are different sections. Different sections mean different floors, different rooms, or different shops, for example. That the sections are different means that the child terminal 30 moved to a different section from a state of being present in the section where the parent terminal 20 is present, for example.

The sound acquisition unit 13 is configured by the control unit 21 of the parent terminal 20. In the case where it is detected by the detection unit 12 that the distance between the parent terminal 20 and the child terminal 30 is the predetermined distance that is set in advance or more, or that the sections are different, the sound acquisition unit 13 instructs the child terminal 30 to acquire a surrounding sound and to transmit the sound to the parent terminal 20. More specifically, the parent terminal 20 instructs the child terminal 30 to activate sound acquisition, through communication by the communication unit 23, and causes the sound acquired by the child terminal 30 to be transmitted to the parent terminal 20.

The sound information output unit 14 is configured by the sound output control unit 214 of the parent terminal 20. For example, the parent terminal 20 outputs information that is based on a sound acquired by the sound acquisition unit 13. Here, in the case where the information based on the sound is sound data, the parent terminal 20 controls the sound output unit 25 by the sound output control unit 214, and outputs a sound that is based on the sound data that is acquired.

The recording control unit 15 is configured by the recording control unit 215 of the parent terminal 20, and records the information based on the sound in the memory of the parent terminal 20 in a reproducible state. Typically, the information based on the sound that is recorded in the recording control unit 15 can be freely output from the sound information output unit 14 according to an operation by a user.

In the case where it is detected by the detection unit 12 that the positional relationship between the parent terminal 20 that is the first terminal and the child terminal 30 that is the second terminal satisfies a condition that is set in advance, the notification control unit 16 notifies a user of the parent terminal 20 through sound or vibration, for example. The notification control unit 16 is configured by the sound output control unit 214 or a vibration unit, not shown, of the parent terminal 20. More specifically, in the case where it is detected by the detection unit 12 that the positional relationship between the parent terminal 20 that is the first terminal and the child terminal 30 that is the second terminal satisfies a condition that is set in advance, the notification control unit 16 causes a notification sound to be output from the sound output unit 25 by the sound output control unit 214.

Figure 5:
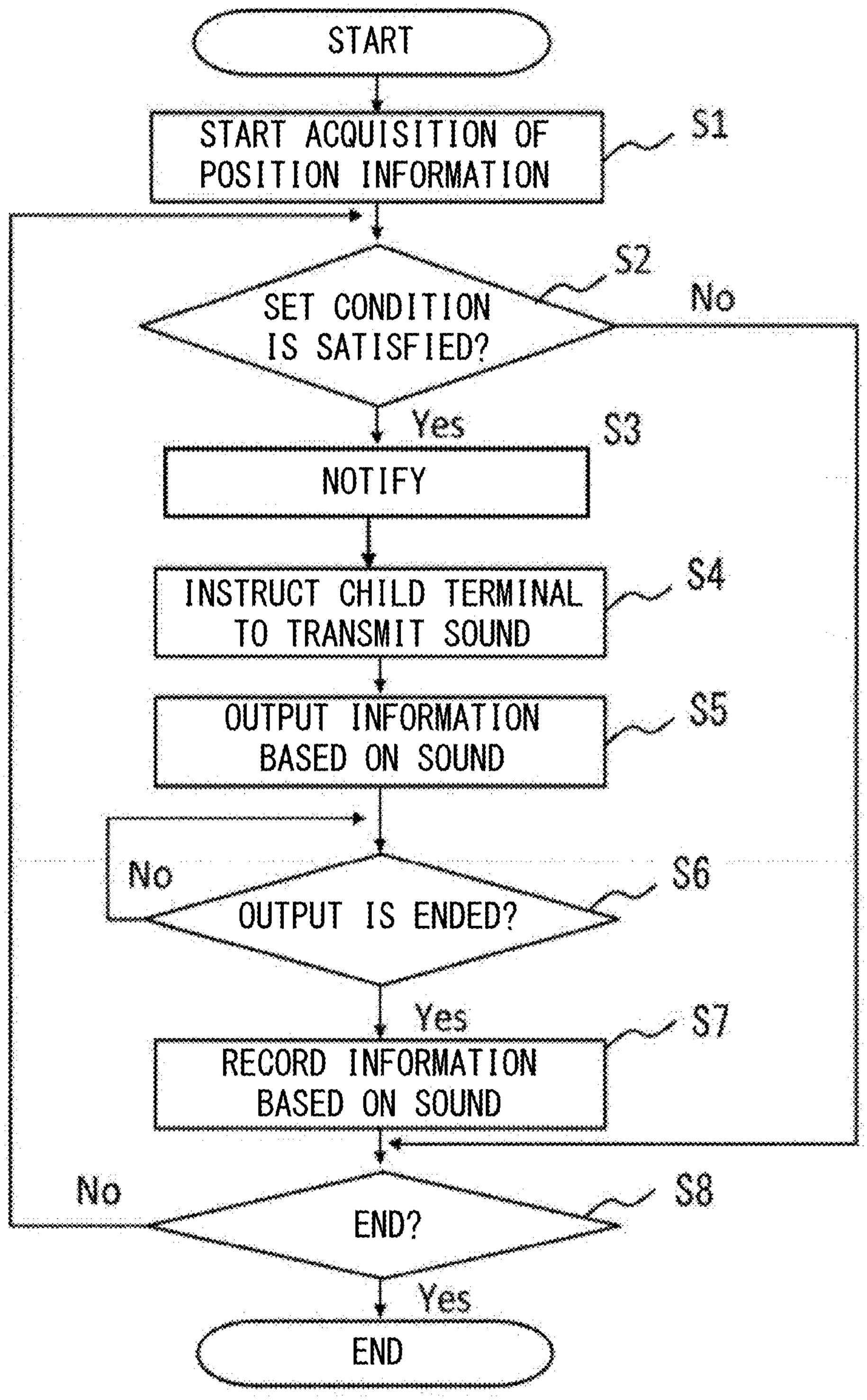
FIG. 5 is a flowchart showing an example operation of the notification system according to the first embodiment.

Next, an example of an operation flow of the notification system will be described with reference to FIG. 5. Processes in FIG. 5 are started when pieces of position information of the parent terminal 20 and the child terminal 30 reach positions in the premises of a commercial facility or the like set in advance, for example, or when an application for executing a notification method is activated due to the parent terminal 20 being operated.

When the processes are started, the terminal information acquisition unit 11 starts acquisition of the position information of the parent terminal 20 and the position information of the child terminal 30 (step S1). That is, the parent terminal 20 acquires the position information of the parent terminal 20 itself by the position information acquisition unit 211, and the child terminal 30 acquires the position information of the child terminal 30 itself by the position information acquisition unit 311. Then, the parent terminal 20 acquires the position information of the child terminal 30 via the communication units 23, 33.

The detection unit 12 determines whether states of the parent terminal 20 and the child terminal 30 are states that satisfy a set condition that is set in advance (step S2). For example, a set condition that is set in advance is that a distance between the parent terminal 20 and the child terminal 30 is at or greater than a predetermined distance such as 15 meters or more, or that the position of the child terminal 30 moved to outside of a shop, outside of premises of a shop, another floor in a shop, or the like that is a section different from inside of the shop, on the premises of the shop, a certain floor in the shop, or the like that is a position where the parent terminal 20 is present. In the following, a description will be given assuming that the set condition is that the distance between the parent terminal 20 and the child terminal 30 is the predetermined distance or more.

In the case where it is determined in step S2 that the set condition is satisfied, and it is determined, for example, that the parent terminal 20 and the child terminal 30 are separated by the predetermined distance or more (Yes in step S2), step S3 is performed next. In the case where the set condition is not satisfied, and the parent terminal 20 and the child terminal 30 are not separated by the predetermined distance or more (No in step S2), for example, step S8 is performed next.

In step S3, the notification control unit 16 issues a notification to a user of the parent terminal 20 using a sound, vibration or the like, and step S4 is performed next. For example, the notification control unit 16 causes an alarm sound to be output from the sound output unit 25 by the sound output control unit 214. The notification control unit 16 may also cause the display unit 24 to display information indicating that the child terminal 30 is separated by the predetermined distance or more, by the display control unit 213, at the same time as the alarm sound.

In step S4, the sound acquisition unit 13 transmits an instruction for causing the child terminal 30 to acquire a surrounding sound and thus causes the acquired sound to be transmitted to the parent terminal 20, and step S5 is performed next. Here, the sound acquisition unit 13 is configured by the control unit 21 of the parent terminal 20, and thus, an instruction to activate sound acquisition, and an instruction to transmit the acquired sound to the parent terminal 20 are given from the parent terminal 20 to the child terminal 30.

In step S5, the sound information output unit 14 outputs information that is based on the sound acquired from the child terminal 30, and step S6 is performed next. More specifically, the sound output unit 25 of the parent terminal 20 outputs the sound acquired from the child terminal 30.

In step S6, the notification system 10 determines whether or not output of the information based on the sound by the sound information output unit 14 is ended. Output of the information based on the sound is ended by operation of the parent terminal 20. Accordingly, step S6 can be replaced with determination of whether or not an output stop operation is received. In the case where it is determined in step S6 that output of the information is not ended (No in step S6), the notification system 10 keeps performing output, and also, repeats determination regarding end of output. In the case where the notification system 10 determines that output of the information is ended (Yes in step S6), step S7 is performed next. Furthermore, in the case of determining that output of the information is ended, the notification system 10 transmits an instruction to stop acquisition of the surrounding sound to the child terminal 30.

In step S7, the recording control unit 15 records the information based on the sound in the memory of the parent terminal 20 in a reproducible manner, and step S8 is performed next.

In step S8, the notification system 10 determines whether to end the processes or not. For example, the processes are ended when pieces of the position information of the parent terminal 20 and the child terminal 30 leave positions indicating inside of premises of a commercial facility or the like set in advance, or when an application for performing the notification method is ended by operation of the parent terminal 20. For example, in the case where the notification system 10 selects to keep performing the processes without ending the processes, or in other words, in the case where an ending process or the like is not performed (No in step S8), step S2 is performed again, and the processes are repeated.

On the other hand, in the case where the notification system 10 is to end the processes (Yes in step S8), it is possible to stop acquisition of a surrounding sound of the child terminal 30 and transmission of the sound to the parent terminal 20 when a predetermined condition is met based on the position information of the parent terminal 20 and the child terminal 30.

Accordingly, in the case where a ward carrying the child terminal 30 moves away from a guardian carrying the parent terminal 20, the guardian can grasp a surrounding situation of the ward via the child terminal 30, and the ward can be prevented from getting into trouble.

In the embodiment described above, a description is given assuming that the first terminal is the parent terminal 20 and the second terminal is the child terminal 30, but instead, the first terminal may be the child terminal 30 and the second terminal may be the parent terminal 20. In this case, in the case where it is detected that the distance between the child terminal 30 as the first terminal and the parent terminal 20 as the second terminal is the predetermined distance set in advance or more, or that the sections are different, the sound acquisition unit 13 acquires a surrounding sound of the parent terminal 20, and the sound information output unit 14 outputs the sound acquired by the sound acquisition unit 13 to the child terminal 30.

Accordingly, the sound acquisition unit 13 is configured by the control unit 31 of the child terminal 30. In the case where it is detected by the detection unit 12 that the distance between the parent terminal 20 and the child terminal 30 is the predetermined distance set in advance or more, or that the sections are different, the sound acquisition unit 13 instructs the parent terminal 20 to acquire a surrounding sound and to transmit the sound to the child terminal 30. More specifically, the parent terminal 20 activates sound acquisition, and also, transmits the acquired sound to the child terminal 30.

Moreover, the sound information output unit 14 is configured by the sound output control unit 214 of the child terminal 30. For example, the child terminal 30 outputs a sound acquired by the sound acquisition unit 13. More specifically, at the child terminal 30, the sound output unit 35 is controlled by the sound output control unit 314, and a sound based on acquired sound data is output.

Accordingly, in the case where a ward carrying the child terminal 30 moves away from a guardian carrying the parent terminal 20, the guardian can talk to the ward through the child terminal 30. Moreover, when a sound from the parent terminal 20 is output from the speaker of the child terminal 30, people around the child terminal 30 can hear the sound from the parent terminal 20, and the ward can be prevented from getting into trouble.

Second Embodiment

Figure 6:
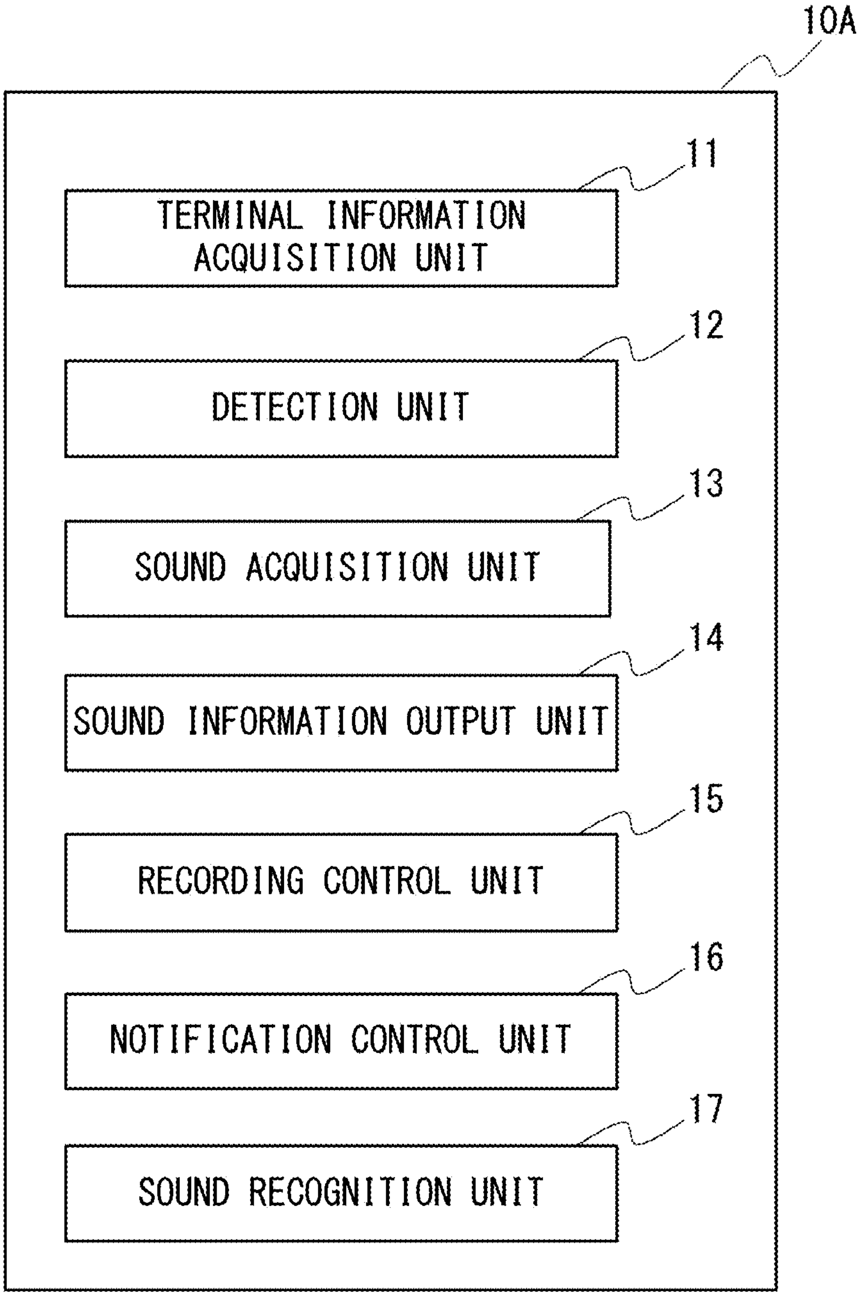
FIG. 6 is a diagram showing an example configuration of a notification system according to a second embodiment.

A present embodiment will be described with reference to FIGS. 6 and 7. FIG. 6 is a diagram showing an example configuration of a notification system 10A. The configuration of the notification system 10A shown in FIG. 6 is different from that of the notification system 10 shown in FIG. 1 in that a sound recognition unit 17 is further included, and also, the function of the sound information output unit 14 is different.

The sound recognition unit 17 performs utterance detection in relation to a sound acquired by the sound acquisition unit 13, and performs text conversion on an uttered sound detected by the utterance detection. The sound recognition unit 17 is configured by the control unit 21 of the parent terminal 20. More specifically, the sound recognition unit 17 performs acoustic model analysis on the sound acquired by the sound acquisition unit 13 on a per-phoneme or per-word basis, and performs comparison with a phoneme model or a language model, and thereby detects utterance contents. The sound recognition unit 17 may perform utterance detection on the sound acquired by the sound acquisition unit 13, with respect to a limited range of a frequency band or a volume level. Furthermore, the sound recognition unit 17 performs text conversion on the uttered sound detected by the utterance detection.

The sound information output unit 14 causes text obtained by conversion by the sound recognition unit 17 to be displayed by the parent terminal 20 that is the first terminal. In this case, the sound information output unit 14 is configured by the display control unit 213 of the parent terminal 20. For example, at the parent terminal 20, information that is based on the sound acquired by the sound acquisition unit 13 is output. Here, in the case where the information based on the sound is text data, the parent terminal 20 controls the display unit 24 by the display control unit 213, and thereby displays the text.

Next, an example of an operation flow of the notification system will be described with reference to FIG. 7. Processes, shown in FIG. 7, from step S11 to step S14 and step S17 are the same as the processes, shown in FIG. 5, from step S1 to step S4 and step S8, and thus, a redundant description will be omitted.

In step S15, the sound recognition unit 17 performs utterance detection on the acquired sound, and determines whether an utterance is detected or not. In the case where it is determined than an utterance is detected (Yes in step S15), step S16 is performed next. In the case where it is not determined that an utterance is detected, or in other words, in a case where it is determined that an utterance is not detected (No in step S15), step S17 is performed next.

In step S16, the sound information output unit 14 outputs information that is based on the sound. Here, the sound information output unit 14 causes text that is based on the detected utterance to be displayed on the display unit 24 of the parent terminal 20.

After step S16, the process for recording the information based on the sound (step S7) may be performed as in the first embodiment. In this case, the text that is based on the detected utterance is recorded.

Accordingly, in the case where a ward carrying the child terminal 30 moves away from a guardian carrying the parent terminal 20, the guardian can grasp a surrounding situation of the ward based on the text that is displayed, and the ward can be prevented from getting into trouble.

Figure 7:
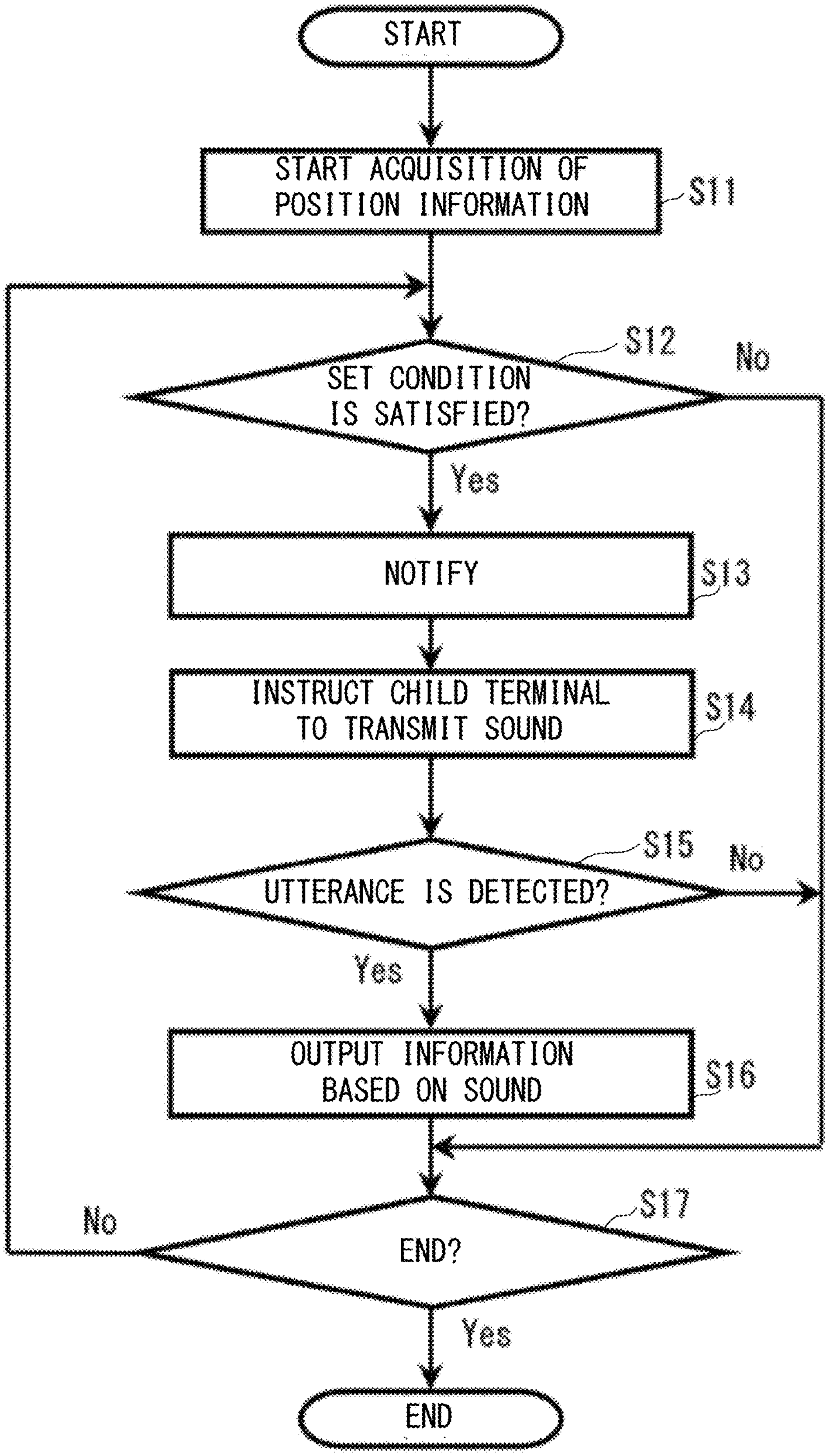
FIG. 7 is a flowchart showing an example operation of a communication system according to the second embodiment.

The processes in step S15 and step S16 shown in FIG. 7 may be performed in parallel with the process in step S5 shown in FIG. 5. In this case, the surrounding sound of the child terminal 30 is output from the parent terminal 20 to be heard, and also, in the case where an utterance is detected, text based on the detected utterance is displayed on the display unit 24 of the parent terminal 20.

Third Embodiment

Figure 8:
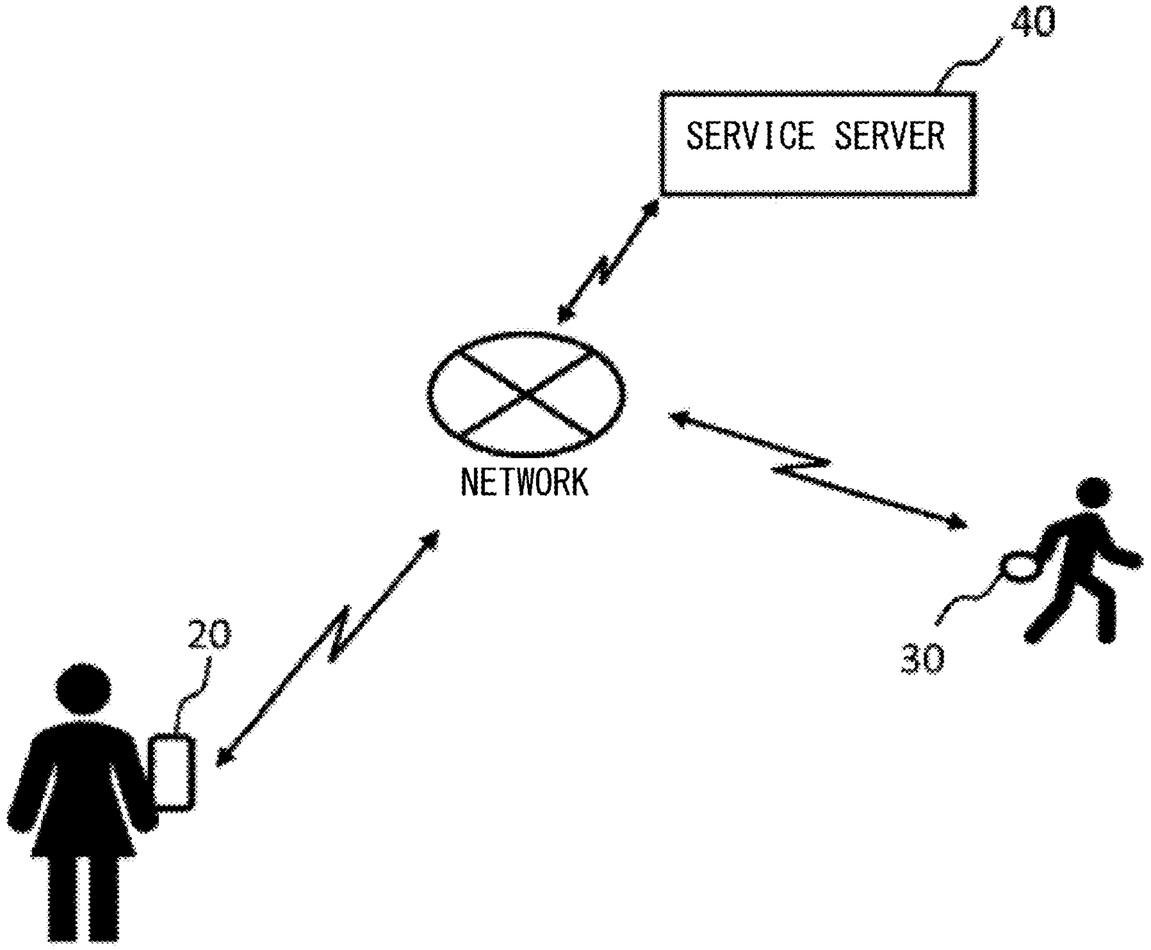
FIG. 8 is a conceptual diagram showing a state where a parent terminal, a child terminal, and a service server according to a third embodiment are connected via a network.

In the first embodiment, the notification system 10 is described to be implemented by a combination of the parent terminal 20 and the child terminal 30, but the system may instead be implemented by a combination of the parent terminal 20, the child terminal 30, and a service server 40 in the manner shown in FIG. 8. In the following, structural elements that achieve the same functions as those of the structural elements described in the first embodiment will be denoted by the same reference signs, and a description thereof will be omitted.

Figure 9:
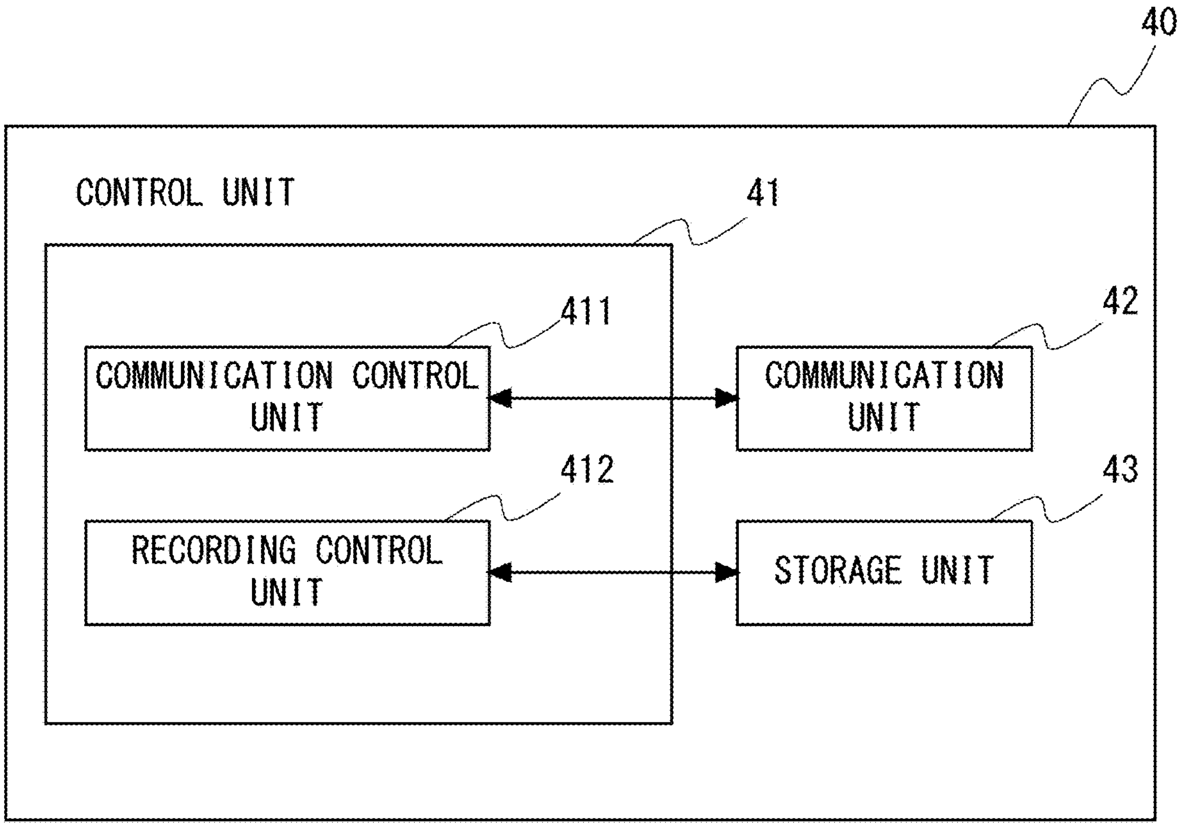
FIG. 9 is a diagram showing an example configuration of the service server according to the third embodiment.

As shown in FIG. 9, the service server 40 includes a control unit 41, a communication unit 42, and a storage unit 43. The service server 40 is a server that relays communication between the parent terminal 20 and the child terminal 30, and is a server contracted with the parent terminal 20, such as a communication carrier server, a server of a security company, or a server of a commercial facility, for example.

The control unit 41 is configured by a memory and an arithmetic apparatus, such as a CPU, provided in the server, and implements various functions by executing programs stored in a memory, such as a ROM or a RAM, in the arithmetic apparatus. As functional blocks to be implemented by the control unit 41, there are included a communication control unit 411 and a recording control unit 412.

The communication control unit 411 performs communication with the parent terminal 20 and the child terminal 30 by controlling operation of the communication unit 42 that is configured by a communication module or the like for transmitting/receiving radio waves for performing wireless communication. Accordingly, the service server 40 can acquire details of an instruction from the parent terminal 20 to the child terminal 30, information based on a sound that is transmitted from the child terminal 30 to the parent terminal 20, and the like.

The recording control unit 412 records, in a reproducible manner, the information based on a sound that is transmitted from the child terminal 30 to the parent terminal. For example, at the time of transmitting sound data input to the child terminal 30 from the child terminal 30 to the parent terminal 20, the recording control unit 412 stores the sound data in the storage unit 43 that is a storage apparatus such as a hard disk drive (HDD) or a solid state drive (SSD) provided in the service server 40.

Next, a description will be given of examples of functional units of the parent terminal 20, the child terminal 30, and the service server 40 and operation thereof at a time of implementing, by the parent terminal 20, the child terminal 30, and the service server 40, functions of the terminal information acquisition unit 11, the detection unit 12, the sound acquisition unit 13, the sound information output unit 14, and the recording control unit 15 of the notification system 10. In other words, in the first embodiment, a description is given assuming that each function of the notification system 10 is implemented by the functions of the parent terminal 20 and the child terminal 30, but a description will now be given of an example where the functions implemented by the functions of the parent terminal 20 and the child terminal 30 are partially performed by the service server 40.

The terminal information acquisition unit 11 is configured by the control unit 41 of the service server 40. More specifically, the control unit 41 of the service server 40 acquires, through communication, the position information of the parent terminal 20 and the position information of the child terminal 30.

The detection unit 12 is configured by the control unit 41 of the service server 40. The detection unit 12 detects that the positional relationship between the parent terminal 20 and the child terminal 30 satisfies a condition that is set in advance.

Here, in the case where the service server 40 is a communication carrier server or a server of a security company, for example, the control unit 41 of the service server 40 can detect that the parent terminal 20 and the child terminal 30 are separated by a predetermined distance that is set in advance or more. In the case where the service server 40 is a server of a commercial facility, the control unit 41 of the service server 40 can detect that the position where the child terminal 30 is present is in a different section from the section where the parent terminal 20 is present, in addition to detecting that the parent terminal 20 and the child terminal 30 are separated by a predetermined distance that is set in advance or more.

The sound acquisition unit 13 is configured by the control unit 41 of the service server 40. More specifically, in the case where satisfaction of a predetermined condition is detected by the detection unit 12, the service server 40 activates acquisition of a sound by the child terminal 30 through communication, and causes the sound acquired by the child terminal 30 to be transmitted to the service server 40. Furthermore, the service server 40 transmits the sound received from the child terminal 30 to the parent terminal 20.

Additionally, in the case where the service server 40 is a server of a commercial facility, for example, and the detection unit 12 is to perform detection of separation of the parent terminal 20 and the child terminal 30 and detection of movement of the parent terminal 20 between sections, acquisition of a sound at the child terminal 30 may be performed when one of such instances is detected, or acquisition of a sound at the child terminal 30 may be performed when both of such instances are detected.

As in the first embodiment, the sound information output unit 14 is configured by at least one of the display control unit 213 and the sound output control unit 214 of the parent terminal 20. For example, at the parent terminal 20, information that is based on a sound acquired by the sound acquisition unit 13 is output. Here, in the case where the information based on a sound is sound data, the parent terminal 20 controls the sound output unit 25 by the sound output control unit 214, and a sound is thereby output. Furthermore, for example, in the case where the information based on a sound is text data, the parent terminal 20 controls the display unit 24 by the display control unit 213, and text is thereby displayed.

Additionally, the notification system 10 may include a sound conversion unit for converting a sound acquired by the sound acquisition unit 13 into text. The sound conversion unit is configured by the control unit 41 of the service server 40. In this case, the service server 40 can convert a sound acquired through communication into text, and can transmit the text data to the parent terminal 20.

The recording control unit 15 is configured by the recording control unit 412 of the service server 40, and records information based on a sound in the memory of the service server 40 in a reproducible manner. Typically, information based on a sound that is recorded by the recording control unit 15 can be output according to operation of the parent terminal 20.

As described above, each function of the notification system 10 can be implemented by the functions of the parent terminal 20, the child terminal 30, and the service server 40. When one or some of the functions are performed by the service server 40, a burden related to functions especially on the parent terminal 20 can be reduced. Accordingly, a terminal not including a predetermined function can be used as the parent terminal 20, and thus, the notification system 10 can be more easily used.

Fourth Embodiment

Figure 10:
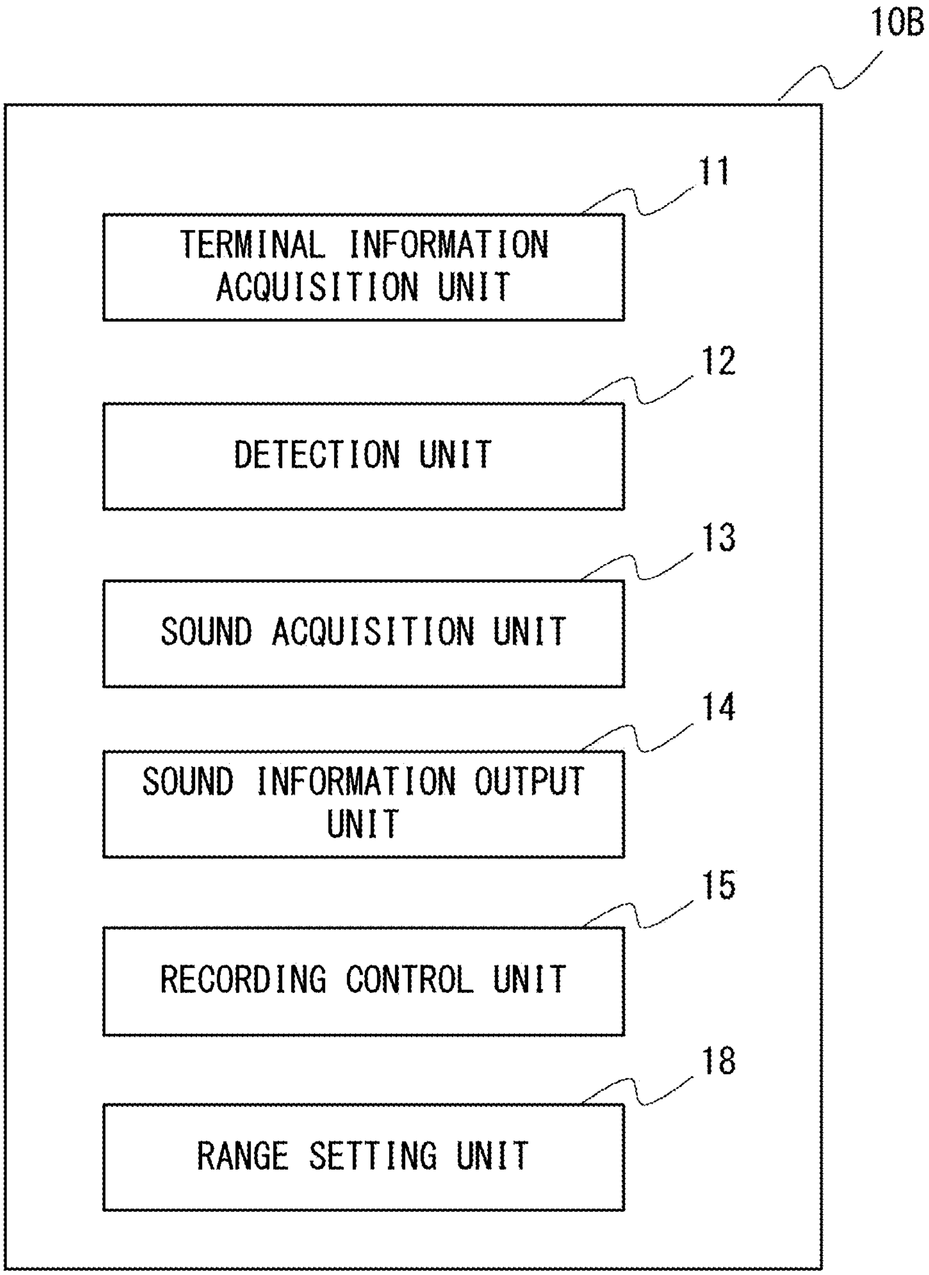
FIG. 10 is a diagram showing an example configuration of a notification system according to a fourth embodiment.

A present embodiment will be described with reference to FIG. 10. FIG. 10 is a diagram showing an example configuration of a notification system 10B. The notification system 10B shown in FIG. 10 is different from the notification system 10 shown in FIG. 1 in that a range setting unit 18 is further included, and also with respect to the function of the detection unit 12.

The range setting unit 18 sets a movable range of the child terminal 30 based on the position information of the parent terminal 20. More specifically, the range setting unit 18 acquires information about surroundings of the parent terminal 20 based on current position information acquired by the position information acquisition unit 211 of the parent terminal 20. The range setting unit 18 sets the movable range of the child terminal 30 based on the information about surroundings of the parent terminal 20 that is acquired. The range setting unit 18 may set the movable range of the child terminal 30 by a user operation on the parent terminal 20, by causing the information about surroundings of the parent terminal 20 that is acquired to be displayed on the display unit 24 by the display control unit 213 of the parent terminal 20.

The range setting unit 18 is configured by one or both of the control unit 21 of the parent terminal 20 and the service server 40. For example, the range setting unit 18 acquires the current position information of the parent terminal 20, and the service server 40 sets the movable range of the child terminal 30 based on the information about surroundings that is based on the current position information. Furthermore, for example, the parent terminal 20 acquires the information about surroundings that is based on the current position information, and the range setting unit 18 sets the movable range of the child terminal 30 based on an operation on the parent terminal 20.

The detection unit 12 acquires information indicating the movable range of the child terminal 30 set by the range setting unit 18, and detects movement of position information of the child terminal 30 to outside the movable range set by the range setting unit 18.

An operation flow of the notification system 10B according to the present embodiment has much in common with the operation flows shown in FIGS. 5 and 7, but is different with respect to a set condition used at a time of determining, in step S2 and step S12, whether a set condition is satisfied or not.

An example of setting the movable range by the range setting unit 18 will be described. For example, in the case where a current position of the parent terminal 20 is a certain position on a second floor of a shopping mall where there are a plurality of shops, the range setting unit 18 sets, as the movable range, based on the position of the parent terminal 20, the entire second floor of the shopping mall or a range indicating shops in the surroundings of the current position of the parent terminal 20, for example. The movable range that is set by the range setting unit 18 may be set based on a mode, a structure, an area or the like of the floor of the shopping mall where the parent terminal 20 is present.

In the case where the range setting unit 18 is to make a user of the parent terminal 20 set the movable range, a floor map of the second floor of the shopping mall where the parent terminal 20 is present is displayed on the display unit 24 of the parent terminal 20. The user of the parent terminal 20 sets the movable range of the child terminal 30 on the floor map displayed on the display unit 24, by operating an operation unit, not shown, such as a touch panel provided on the display unit 24. In this case, for example, a range surrounded or selected by a user operation on the floor map displayed on the display unit 24 is set as the movable range of the child terminal 30.

For example, in the case where the current position of the parent terminal 20 is inside a park, the range setting unit 18 sets, as the movable range, based on the position where the parent terminal 20 is present, a range such as the entire park, a predetermined section in the park, or a nearby urban area including the park. The movable range that is set by the range setting unit 18 may be set based on a mode, a structure, an area or the like of the park where the parent terminal 20 is present.

In the case where the range setting unit 18 is to make the user of the parent terminal 20 set the movable range, a map of inside of the park where the parent terminal 20 is present or a map of the surroundings including the park is displayed on the display unit 24 of the parent terminal 20. The user of the parent terminal 20 sets the movable range of the child terminal 30 on the map displayed on the display unit 24, by operating an operation unit, not shown, such as a touch panel provided on the display unit 24. In this case, for example, a range surrounded or selected by a user operation on the map displayed on the display unit 24 is set as the movable range of the child terminal 30.

When causing information about the surroundings of the parent terminal 20 to be displayed on the display unit 24 of the parent terminal 20, the range setting unit 18 may also cause the current position of the parent terminal 20 and the current position of the child terminal 30 to be displayed. Moreover, setting of the movable range by the range setting unit 18 may be performed in a case where the child terminal 30 is present near the parent terminal 20.

Accordingly, in the case where a ward carrying the child terminal 30 moves out of the movable range set in advance, a guardian can talk to the ward through the child terminal 30. Moreover, when a sound from the parent terminal 20 is output from the speaker of the child terminal 30, people around the child terminal 30 can hear the sound from the parent terminal 20, and the ward can be prevented from getting into trouble.

Additionally, the present invention is not limited to the embodiments described above, and can be changed as appropriate within the scope of the gist of the invention. For example, in the examples described above, one child terminal 30 is used in association with one parent terminal 20, but a plurality of child terminals 30 may instead be used in association with one parent terminal 20. Also in this case, one parent terminal 20 and one child terminal 30 registered in the parent terminal 20 can be treated as one pair.

Furthermore, for example, the condition under which the child terminal 30 acquires a surrounding sound is at least one of separation of the parent terminal 20 and the child terminal 30 by a predetermined distance or more, and movement of the position of the child terminal 30 to a section different from the section where the parent terminal 20 is present, but other conditions such as movement of the child terminal 30 between sections may also be used.

The present disclosure includes matters that contribute to the realization of "Sustainable Cities and Communities" of Sustainable Development Goals (SDGs), and that contribute to safety and security of public facilities.

Contents of the present disclosure can be used by various systems that include a plurality of terminals.

What is claimed is:

1. A notification system comprising:

a terminal information acquisition unit configured to acquire position information of a first terminal and position information of a second terminal that performs communication with the first terminal, and to acquire a positional relationship between the first terminal and the second terminal;

a detection unit configured to detect that the positional relationship between the first terminal and the second terminal satisfies a condition that is set in advance;

a sound acquisition unit configured to acquire a sound of surroundings of the second terminal, in a case where the detection unit detects that the positional relationship between the first terminal and the second terminal satisfies the condition that is set in advance; and a sound information output unit configured to output, from the first terminal, information that is based on the sound acquired by the sound acquisition unit, wherein the detection unit sets the condition in advance as at least one of:

that a distance between the first terminal and the second terminal has become greater than a predetermined distance, or that a section in which the first terminal exists and the section in which the second terminal exists have become different sections.

2. The notification system according to claim 1, further comprising a sound recognition unit configured to perform utterance detection on the sound acquired by the sound acquisition unit around the second terminal, and to perform text conversion on an uttered sound detected by the utterance detection, wherein the sound information output unit causes text obtained by conversion by the sound recognition unit to be displayed on the first terminal.

3. The notification system according to claim 1, further comprising a recording control unit configured to record the information that is based on the sound of surroundings of the second terminal acquired by the sound acquisition unit in a manner reproducible by the first terminal.

4. A notification system comprising:

a terminal information acquisition unit configured to acquire position information of a first terminal and position information of a second terminal that performs communication with the first terminal, and to acquire a positional relationship between the first terminal and the second terminal;

a detection unit configured to detect that the positional relationship between the first terminal and the second terminal satisfies a condition that is set in advance;

a sound acquisition unit configured to acquire a sound of surroundings of the second terminal, in a case where the detection unit detects that the positional relationship between the first terminal and the second terminal satisfies the condition that is set in advance;

a sound information output unit configured to output, from the first terminal, information that is based on the sound acquired by the sound acquisition unit; and a range setting unit configured to set a movable range of the second terminal based on the position information of the first terminal, wherein the detection unit uses, as the condition that is set in advance, movement of the position information of the second terminal to outside the movable range set by the range setting unit.

5. A notification method performed by a notification system, the notification method comprising:

a terminal information acquisition step of acquiring position information of a first terminal and position information of a second terminal that performs communication with the first terminal, and of acquiring a positional relationship between the first terminal and the second terminal;

a detection step of detecting that the positional relationship between the first terminal and the second terminal satisfies a condition that is set in advance;

a sound acquisition step of acquiring a sound of surroundings of the second terminal, in a case where it is detected in the detection step that the positional relationship between the first terminal and the second terminal satisfies the condition that is set in advance; and a sound information output step of outputting, from the first terminal, information that is based on the sound that is acquired, wherein, in the detection step, the condition that is set in advance is at least one of:

that a distance between the first terminal and the second terminal has become greater than a predetermined distance, or that a section in which the first terminal exists and the section in which the second terminal exists have become different sections.

* * * * *